UNITED STATES PATENT OFFICE.

MAX CONRAD, OF ASCHAFFENBURG, GERMANY.

PROCESS OF MAKING DIALKYLBARBITURIC ACIDS.

No. 817,159. Specification of Letters Patent. Patented April 10, 1906.

Application filed May 16, 1905. Serial No. 260,723.

*To all whom it may concern:*

Be it known that I, MAX CONRAD, a subject of the German Emperor, residing at Aschaffenburg, Germany, have invented a new and useful Improvement in Processes of Preparation of Dialkylbarbituric Acids, of which the following is a specification.

It has been made known by the German Patent Application C 12,388 that dialkylcyanacetyl urea can be converted into dialkylmalon-uramic amid by heating with acids:

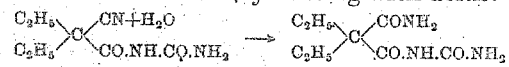

Further investigations have now shown that by heating with acids for a longer time and at a higher temperature this dialkyl-malonuramic amid can be converted into dialkylbarbituric acid:

By heating dialkyl-cyanacetyl urea for a longer time and at a somewhat higher temperature it is possible, therefore, to convert the same directly into dialkylbarbituric acids without first isolating the dialkyl-malonuramic amid.

Example 1: Diethyl-malon-uramic-acid amid of melting-point 199° centigrade is heated with two to five times its quantity of concentrated sulfuric acid for several hours (*e. g.*, fifteen hours) at about 100° to 110° centigrade, and the solution after cooling is poured upon ice. Diethyl-malonyl urea (diethylbarbituric acid) separates out. It is easily separated from the adhering mother substances and diethyl-malon-uramic acid by means of diluted solution of sodium hydrate or ammonia-water. It is precipitated again from its solutions in alkali by neutralization with acetic acid or by dilution of its solutions in ammonia-water.

Example 2: One hundred grams diethyl-cyanacetyl urea of melting-point 118° centigrade are heated with two hundred grams concentrated sulfuric acid for several hours (*e. g.*, twenty-four hours) at 100° to 110° centigrade. The resulting solution after cooling is poured upon ice, diethylbarbituric acid being thus separated. The new compound is easily freed from possible impurities by diluted solution of sodium hydrate or ammonia-water, and then is further treated, as in Example 1.

Example 3: Diethyl-cyanacetyl urea is heated for several hours (*e. g.*, twenty-four hours) with five parts of concentrated hydrochloric acid at 100° centigrade in a closed flask and then evaporated to dryness. Diethylbarbituric acid is thus obtained.

Having thus described my invention, what I claim as new, and desire to secure by Letters Patent, is—

1. A process for preparation of dialkylbarbituric acid which consists in heating dialkyl-cyanacetyl urea with acid.

2. A process for preparation of dialkylbarbituric acid which consists in heating dialkyl-malon-uramicacid amid with an acid until the dialkylbarbituric acid is formed.

3. A process for preparation of dialkylbarbituric acid which consists in heating dialkyl-cyanacetyl urea with acid until it is converted into dialkyl-malon-uramic amid and then continuing the heating until dialkylbarbituric acid is formed.

In testimony whereof I have hereunto signed my name in the presence of two subscribing witnesses.

MAX CONRAD

Witnesses:
 JEAN GRUND,
 CARL GRUND.